United States Patent
Hamam et al.

(10) Patent No.: US 12,442,283 B2
(45) Date of Patent: Oct. 14, 2025

(54) MULTIDIMENSIONAL FULL FIELD DEVELOPMENT OPTIMIZATION GUIDED BY VARIABILITY IN WELL PLACEMENT AND CONFIGURATION

(71) Applicant: Saudi Arabian Oil Company, Dhahran (SA)

(72) Inventors: Hassan Hasan Hamam, Al Khobar (SA); Saad Ayidh Garni, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1099 days.

(21) Appl. No.: 17/400,275

(22) Filed: Aug. 12, 2021

(65) Prior Publication Data

US 2023/0052919 A1    Feb. 16, 2023

(51) Int. Cl.
| | |
|---|---|
| *E21B 43/30* | (2006.01) |
| *E21B 41/00* | (2006.01) |
| *G01V 20/00* | (2024.01) |
| *G06F 30/27* | (2020.01) |

(Continued)

(52) U.S. Cl.
CPC .......... *E21B 43/305* (2013.01); *G01V 20/00* (2024.01); *G06F 30/27* (2020.01); *E21B 41/0035* (2013.01); *E21B 43/30* (2013.01); *E21B 2200/20* (2020.05); *E21B 2200/22* (2020.05); *G01V 2210/66* (2013.01); *G06F 30/15* (2020.01); *G06F 30/20* (2020.01)

(58) Field of Classification Search
CPC ............... E21B 43/305; E21B 2200/20; E21B 2200/22; E21B 41/0035; E21B 43/30; G06F 30/27; G06F 30/15; G06F 30/20; G01V 20/00; G01V 2210/66
USPC .......................................................... 703/10
See application file for complete search history.

(56) References Cited

U.S. PATENT DOCUMENTS

| | | | |
|---|---|---|---|
| 2013/0020131 | A1 | 1/2013 | Le Ravalec et al. |
| 2016/0003008 | A1 | 1/2016 | Uribe et al. |
| 2018/0038204 | A1* | 2/2018 | Khan ........................ E21B 7/04 |

FOREIGN PATENT DOCUMENTS

WO    WO-2022010980 A1 *  1/2022  ............. E21B 21/08

OTHER PUBLICATIONS

Basharat Ali, Assisted Field Development Plannin Through Well Placement Automation, (Year: 2020).*

(Continued)

*Primary Examiner* — John E Johansen
(74) *Attorney, Agent, or Firm* — Fish & Richardson P.C.

(57) ABSTRACT

Systems and methods include a computer-implemented method for performing well placement and configuration. Two-dimensional (2D) target entry (TE) points are generated in an area of interest (AOI) for wells to be drilled in an oil reservoir, where the 2D TE points are positioned according to a defined well length resolution. A single lateral is designed for each well using the 2D TE points, where each single lateral is designed with a different length, completion zone, azimuth, and orientation. Using the single laterals, a dynamic reservoir simulation is executed for the wells to be drilled in the oil reservoir, including rotating between different three-dimensional (3D) configurations for each 2D TE. A 3D configuration for each 2D TE is selected for each lateral and based on executing the dynamic reservoir simulation.

17 Claims, 16 Drawing Sheets

(51) Int. Cl.
G06F 30/15 (2020.01)
G06F 30/20 (2020.01)

(56) References Cited

OTHER PUBLICATIONS

Mohamad Alkhatib, A Novel Holistic Workflow for Field Development Planning in Green Field Environment: A Case Study (Year: 2018).*

Ali et al., "Assisted Field Development Planning Through Well Placement Automation," IPTC-19715-MS, presented at the International Petroleum Technology Conference, Dhahran, SA, Jan. 13-15, 2020, 17 pages.

Alkhatib et al., "A Novel Holistic Workflow for Field Development Planning in Green Field Environment: A Case Study," SPE-193140-MS, Society of Petroleum Engineers (SPE), presented at the Abu Dhabi International Petroleum Exhibition and Conference, Nov. 12-15, 2018, 16 pages.

* cited by examiner

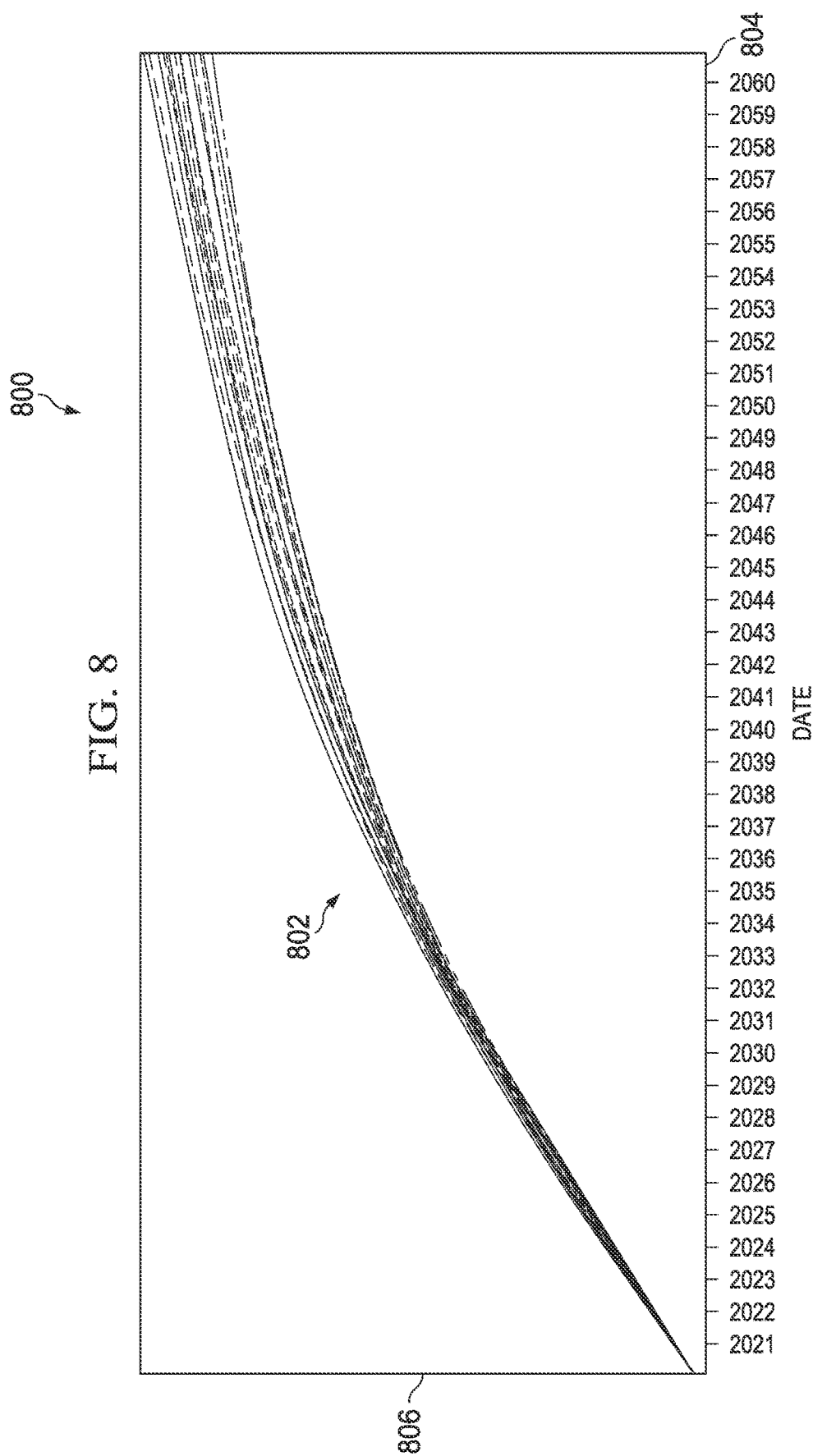

MULTIDIMENSIONAL FULL FIELD DEVELOPMENT OPTIMIZATION GUIDED BY VARIABILITY IN WELL PLACEMENT AND CONFIGURATION

TECHNICAL FIELD

The present disclosure applies to techniques for selecting the placement of wells.

BACKGROUND

Well placement and configuration optimization is a major step in the full field development milestone for reservoirs. In addition to selecting and implementing a development strategy, an optimum field development plan can be deployed to maximize the recovery while minimizing the cost. A well design stage can encompass various aspects of well configuration, including major components such as well orientation, target zones, lateral length, the number of laterals, lateral spacing, and completions. Well architecture design can be a comprehensive, time-consuming, and computationally exhaustive stage. Natural complexities such as fractures, faults, and heterogeneities can complicate the architecture design process.

SUMMARY

The present disclosure describes techniques that can be used for a multidimensional full-field development optimization guided by variability in well placement and configuration. In some implementations, a computer-implemented method includes the following. Two-dimensional (2D) target entry (TE) points are generated in an area of interest (AOI) for wells to be drilled in an oil reservoir, where the 2D TE points are positioned according to a defined well length resolution. A single lateral is designed for each well using the 2D TE points, where each single lateral is designed with a different length, completion zone, azimuth, and orientation. Using the single laterals, a dynamic reservoir simulation is executed for the wells to be drilled in the oil reservoir, including rotating between different three-dimensional (3D) configurations for each 2D TE. A 3D configuration for each 2D TE is selected for each lateral and based on executing the dynamic reservoir simulation.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. The techniques of the present disclosure can facilitate a different design for every well as part of a field in a systematic manner, providing an advantage over conventional systems that provide a single design for the entire field. The techniques of the present disclosure can provide for variations and optimization of well level architecture as part of a full field. For example, the techniques begin with a single lateral evaluation, and then perform optimization on the number of laterals. This is an improvement over conventional systems that establish a well type first (for example, vertical, single lateral, or dual lateral), then optimizing on the well type. The techniques of the present disclosure can provide a systematic approach to the use of different well configuration in every drill location. For example, every single well configuration and design can be assessed, and each design can be evaluated against nearby wells in terms of interference. The techniques of the present disclosure can be used to evaluate every single well configuration without the need of reservoir opportunity index techniques or sweet spots. The optimized full field development plan can include wells that are articulated, configured and placed differently in the most optimum zones, enhancing sweep efficiency and maximize recovery.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 8 is a graph showing examples of curves for different configurations plotted relative to time (for example, in years) and production (for example, in millions of barrels), according to some implementations of the present disclosure.

Like reference numbers and designations in the various drawings indicate like elements.

DETAILED DESCRIPTION

Figure 1A:
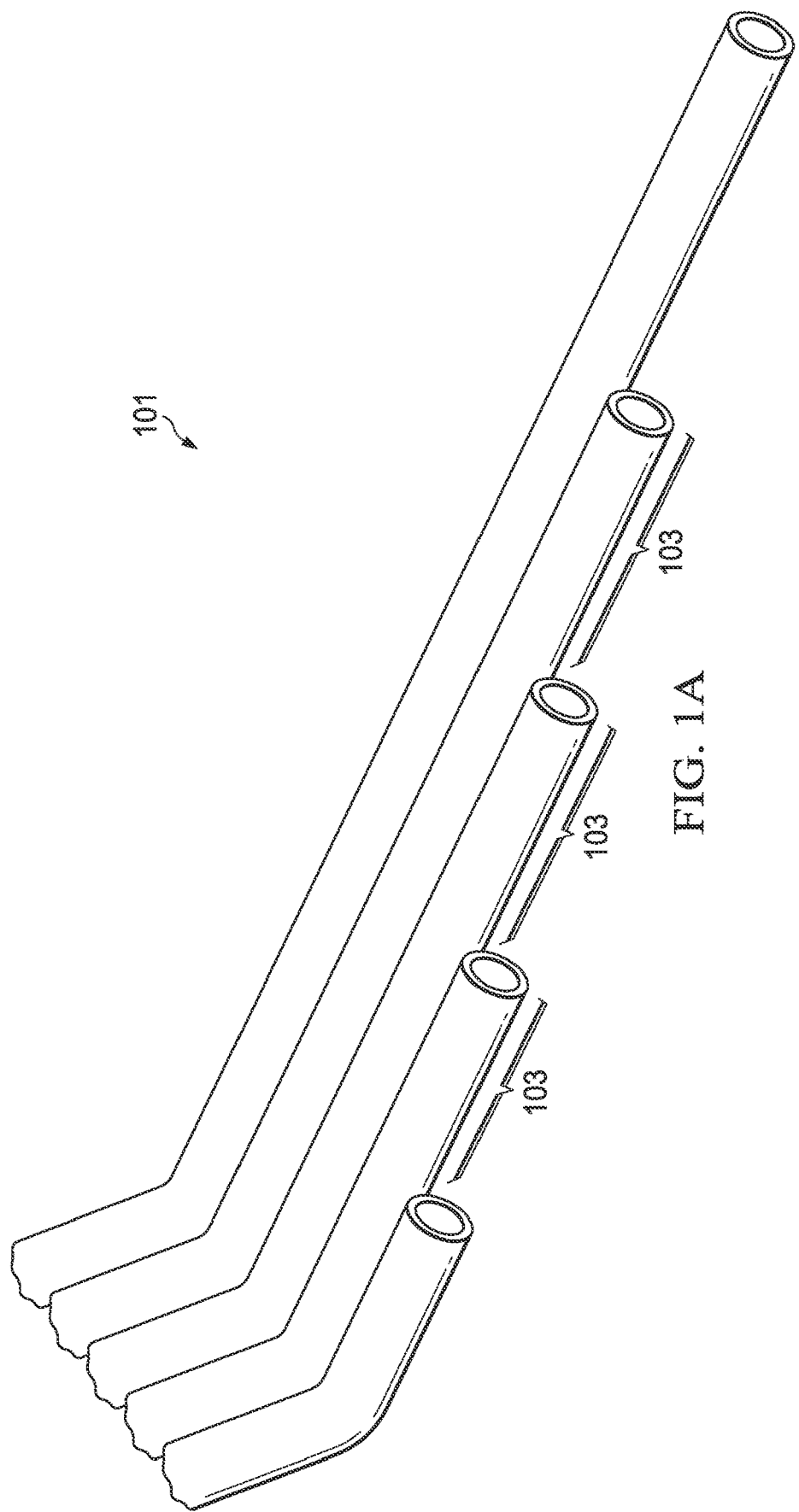
FIG. 1A is a diagram of a well with laterals, according to some implementations of the present disclosure.

The following detailed description describes techniques for a multidimensional full-field development optimization guided by variability in well placement and configuration. For example, optimization can refer to achieving values that indicate or result in a performance (for example, well production) greater than a predefined threshold. Typically, full field development plans considers overall regional reservoir differences during well articulation, configuration, and placement. However, due to the overwhelming number of possible scenarios and expensive computational overhead, full-field development plans have one design for all the wells in a particular region yielding a certain recovery. With the approach of the present disclosure, every well is configured and placed differently from surrounding wells, while also assessing the impact of surrounding wells on each individual well, ultimately leading to prolonging well life, sustaining plateau, and increasing recovery. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

When selecting the placement of wells, there is no clear way to determine well orientation. Different conventional techniques can be used in which well orientation depends on structure, dipping, and oil column. Heterogeneity can also play a major role in well orientation, as different parts of a reservoir may require different orientations. Using the techniques of the present disclosure, a 360-degree approach can be applied to assess the impact of orientation on well performance.

Target zones or completion zones can depend on the reservoir quality. A primary objective of a completion zone is to complete the well in the most prolific and homogenous part of the reservoir. Typically, this refers to a particular zone or zones in order to maximize recovery, and avoid uneven sweep. Similar to the well orientation, there is no intuitive way to select the target zone other than utilizing existing data and expertise.

Lateral length is one of the main components of the well architecture. Conventional techniques may tend to maximize reservoir contact for the highest productivity. However, there is no clear methodology for selecting the maximum lateral length. In approach used in the present disclosure, variations on lateral length are conducted until an optimal length is selected based on a productivity index (PI).

A lateral length methodology can provide an optimum lateral length among various designs. The lateral length design can be taken forward to select an optimum number of laterals. Conventionally, well types depend on the number of laterals. For example, a dual lateral has two laterals, and a tri-lateral has three laterals that are pre-determined. This approach provides the well type as a bi-product of the number of laterals. Note that while selecting the optimum design for any parameter, extreme cases that may not be operationally possible may still be tested in order to explore all possible options and their applicability. This provides a true test of the simulation model and its credibility to match real field observations.

In developing the techniques of the present disclosure, a benchmarking case selected for dual lateral case design can be selected as the optimum case from the single lateral scenarios. In this configuration, variations on lateral spacing can be carried to select the optimum lateral spacing. A wide range of spacing can be evaluated, from very close (for example, 100 meters) to very wide (for example, 1 kilometer). In dual lateral design, all laterals can be designed so that they are parallel to the main wellbore with the minimum spacing as specified.

To implement the techniques of the present disclosure, specialized computer software can be utilized that is capable of producing a wide variety of well designs that automatically cover different combinations of orientations, target zones, and lateral length. The specialized computer software can be used to rapidly design and optimize full field development plans that capture variability within well configuration.

The techniques of the present disclosure are different from conventional techniques by considering and exploiting every single well configuration and design as part of a full field development scenario. The techniques of the present disclosure can excel in capturing well design variability for the full field, which conventional approaches do not capture due to the overwhelming nature and complexity of this exercise. Conventional approaches may expand individual optimized well designs to a full field, but the conventional approaches do not work for most fractured or heterogeneous reservoirs.

The techniques of the present disclosure can facilitate full field development optimization plans that are developed through a standardized, systematic approach that considers: a number of laterals, lateral length, completion zones, azimuth, and orientation. Moreover, the techniques of the present disclosure can be used to evaluate the impact of every single well design on surrounding wells as well as the overall full field development plan.

FIG. 1A is a diagram of a well 101 with laterals 103, according to some implementations of the present disclosure. The well 100 can include single laterals of different lengths, completion zones, azimuths, and orientation.

Figure 1B:
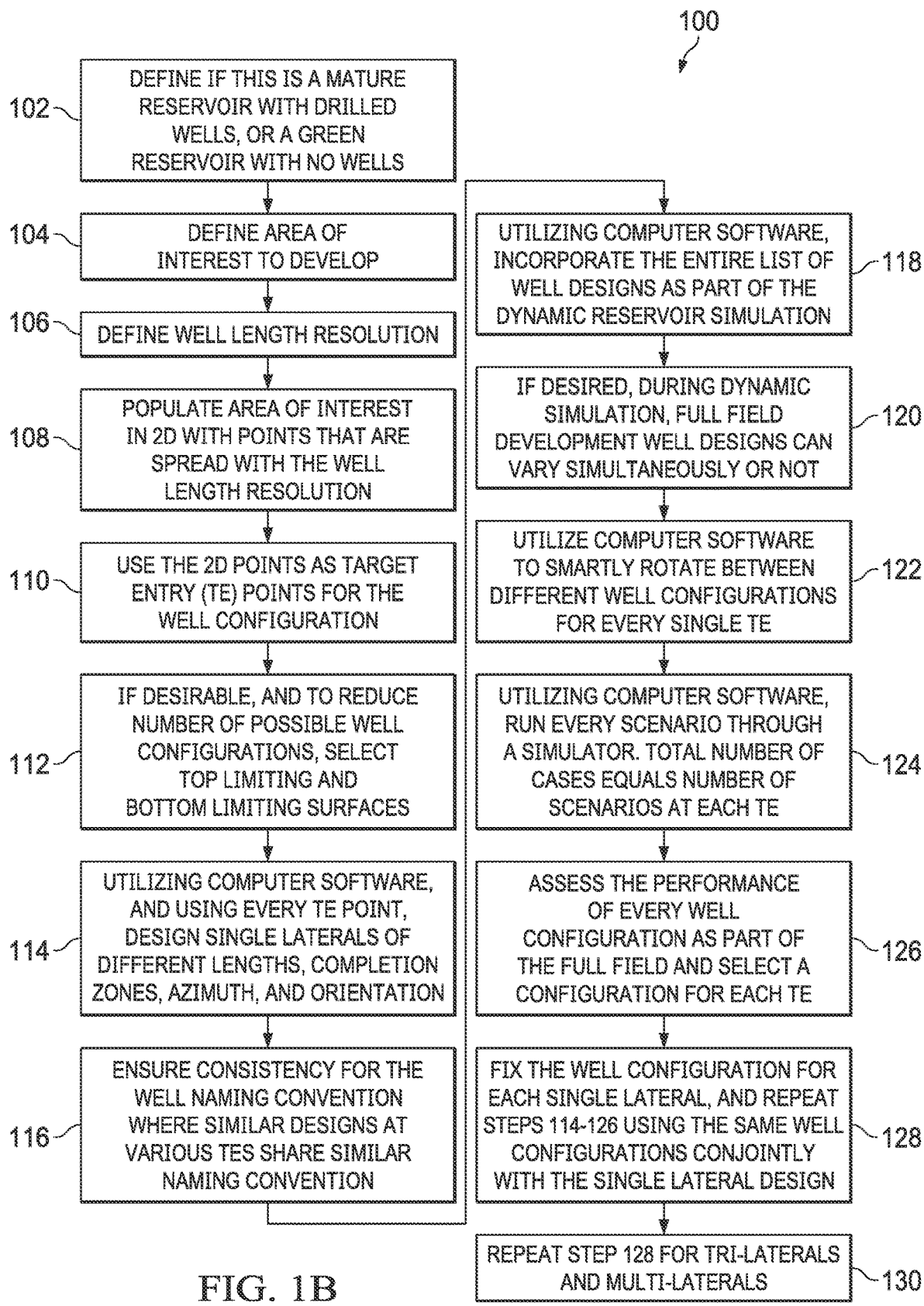
FIG. 1B is a flow diagram showing an example of a workflow for performing well placement and configuration, according to some implementations of the present disclosure.

FIG. 1B is a flow diagram showing an example of a workflow 100 for performing well placement and configuration, according to some implementations of the present disclosure.

Figure 2C:
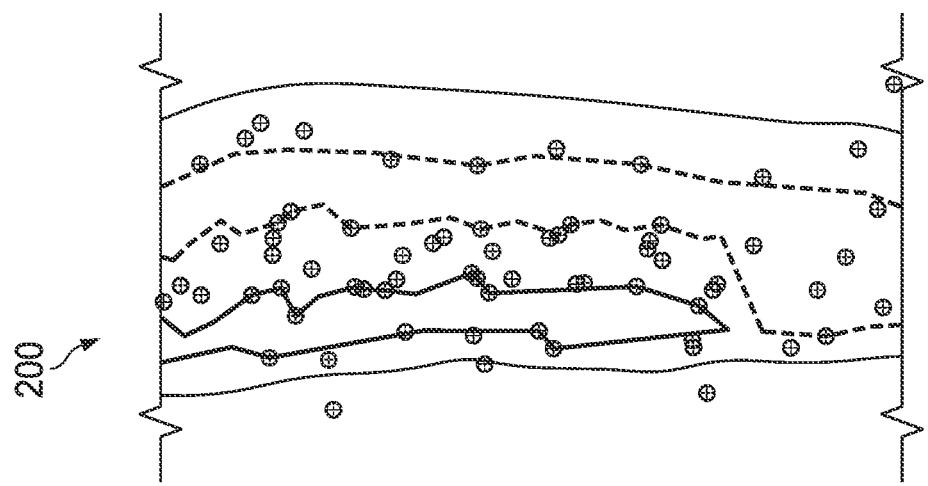
FIG. 2C is a diagram showing an example of a reservoir area of interest with drilled wells, according to some implementations of the present disclosure.
Figure 2B:
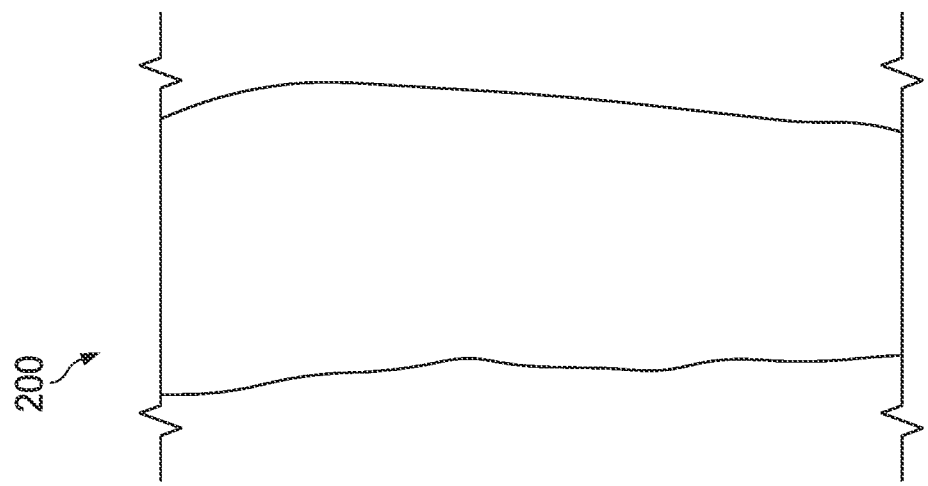
FIG. 2B is a diagram showing an example of a reservoir 204 without drilled wells, according to some implementations of the present disclosure.
Figure 2A:
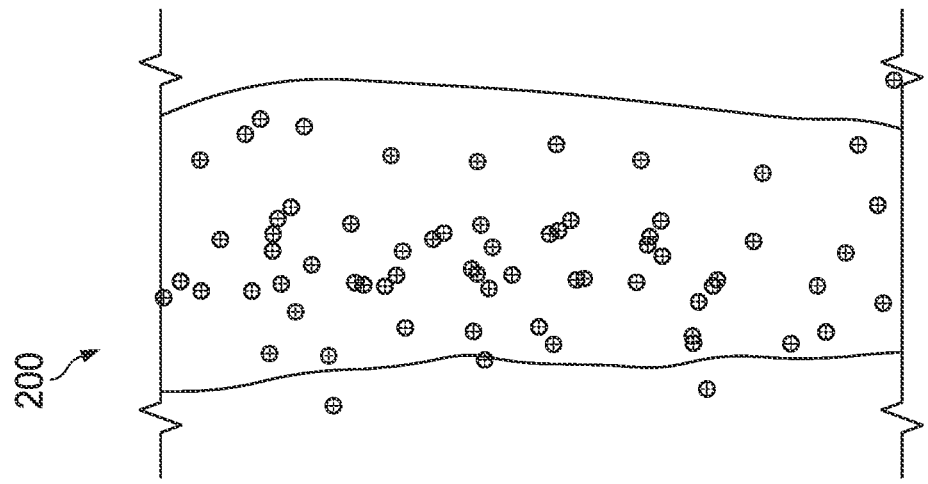
FIG. 2A is a diagram showing an example of a reservoir with drilled wells, according to some implementations of the present disclosure.

At 102, a determination is made whether a well is a mature reservoir with drilled wells or a green reservoir with no wells. FIG. 2A is a diagram showing an example of a reservoir 202 with drilled wells, according to some implementations of the present disclosure. FIG. 2B is a diagram showing an example of a reservoir 204 without drilled wells, according to some implementations of the present disclosure.

Figure 2E:
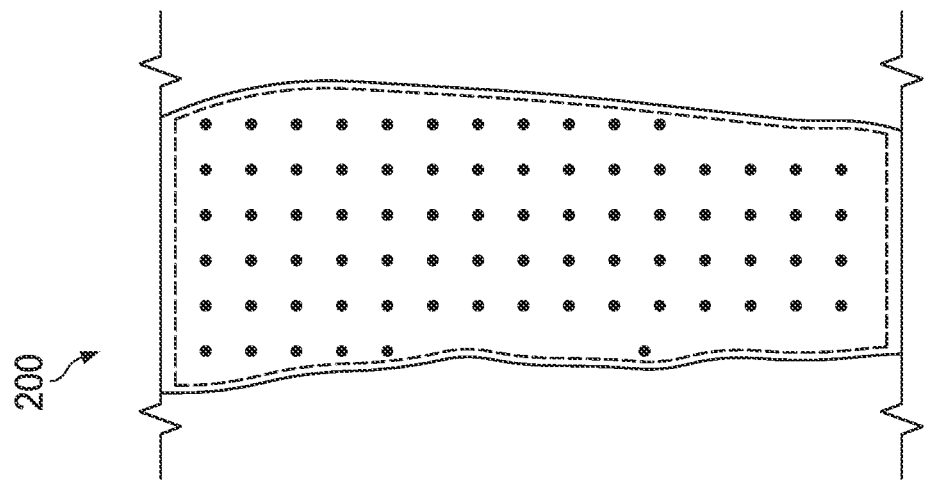
FIG. 2E is a diagram showing an example of a reservoir area of interest without drilled wells where the entire area is considered for development, according to some implementations of the present disclosure.
Figure 2D:
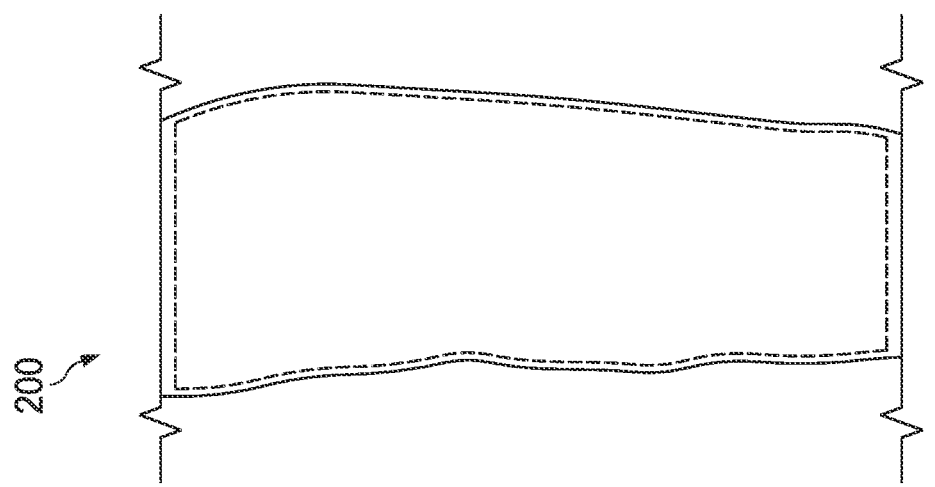
FIG. 2D is a diagram showing an example of a reservoir area of interest without drilled wells, according to some implementations of the present disclosure.

At 104, an area of interest for development is defined. For mature reservoirs, target development can consider areas that don't have any wells, while for a green reservoir (reservoir without any drilled wells), the entire reservoir area can be considered. FIG. 2C is a diagram showing an example of a reservoir area of interest 206 with drilled wells, according to some implementations of the present disclosure. FIG. 2D is a diagram showing an example of a reservoir area of interest 208 without drilled wells, according to some implementations of the present disclosure.

At 106, well length resolution is defined. This is important so that target entry points for the wells do not overlap and to provide minimal interference between wells.

At 108, the area of interest in two dimensions (2D) is populated with points that are spread with the well length resolution. FIG. 2E is a diagram showing an example of a reservoir area of interest 210 without drilled wells where the entire area is considered for development, according to some implementations of the present disclosure.

At 120, the 2D points are used as target entry (TE) points for the well configuration design in three dimensions (3D).

Figure 3:
FIG. 3 is an image showing an example of a top limiting surface, according to some implementations of the present disclosure.

At 122, to reduce the number of possible well configurations, top and bottom limiting surfaces are selected. FIG. 3 is an image 300 showing an example of a top limiting surface 302, according to some implementations of the present disclosure. Bottom limiting surfaces 304 vary in different well configurations that can be considered.

Figure 4:
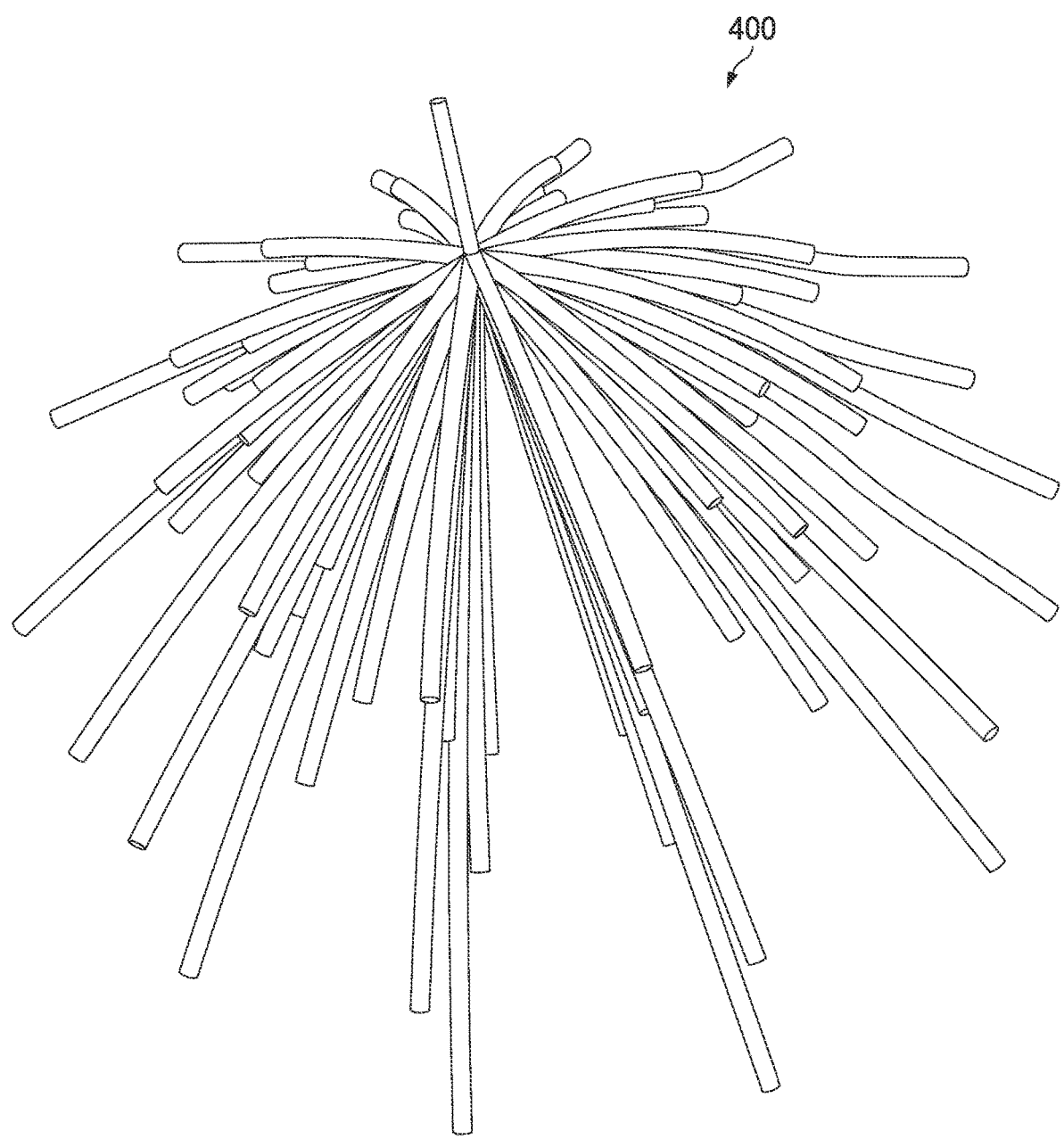
FIG. 4 is a diagram showing examples of single laterals of different lengths, completion zones, azimuths, and orientation, according to some implementations of the present disclosure.

At 124, utilizing a computer software, and using every TE point, single laterals of different lengths, completion zones, azimuths, and orientation are designed. This is done for every single point, as can be seen in the image below. This could amount to hundreds of well configurations per target entry. FIG. 4 is a diagram showing examples of single laterals 400 of different lengths, completion zones, azimuths, and orientation, according to some implementations of the present disclosure.

Figure 5:
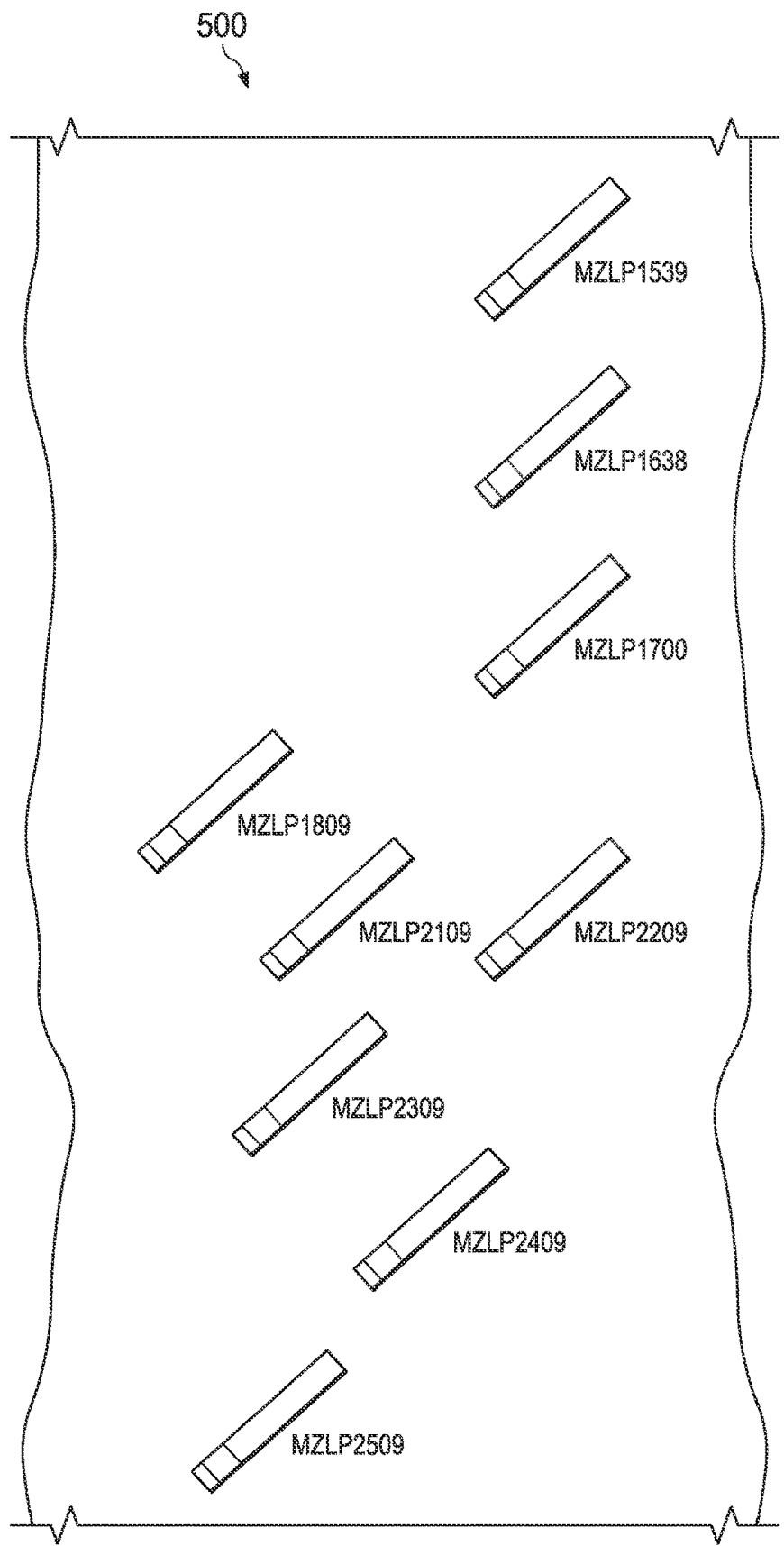
FIG. 5 is a diagram showing examples of TEs labeled with labels having a naming convention, according to some implementations of the present disclosure.

At 116, consistency for the well naming convention is ensured, where similar designs at various TEs share similar naming convention. This step is very important to control or impose a particular well configuration for all the wells. FIG. 5 is a diagram 500 showing examples of TEs labeled with labels 502 having a naming convention, according to some implementations of the present disclosure. In the labels 502 of FIG. 5, the first two digits of the label for each well are different, the last 2 digits are sometimes the same. This provides value in evaluating certain well configuration scenarios as required. An example naming convention format is MZIP##nn, where MZI is a field/reservoir abbreviation, P indicates a Producer (P) or Injector (I) well, ## is a unique TE point identifier (ID), and nn is a well configuration (different lateral length, target zone, azimuth, and top and bottom limiting surfaces).

Figure 6A:
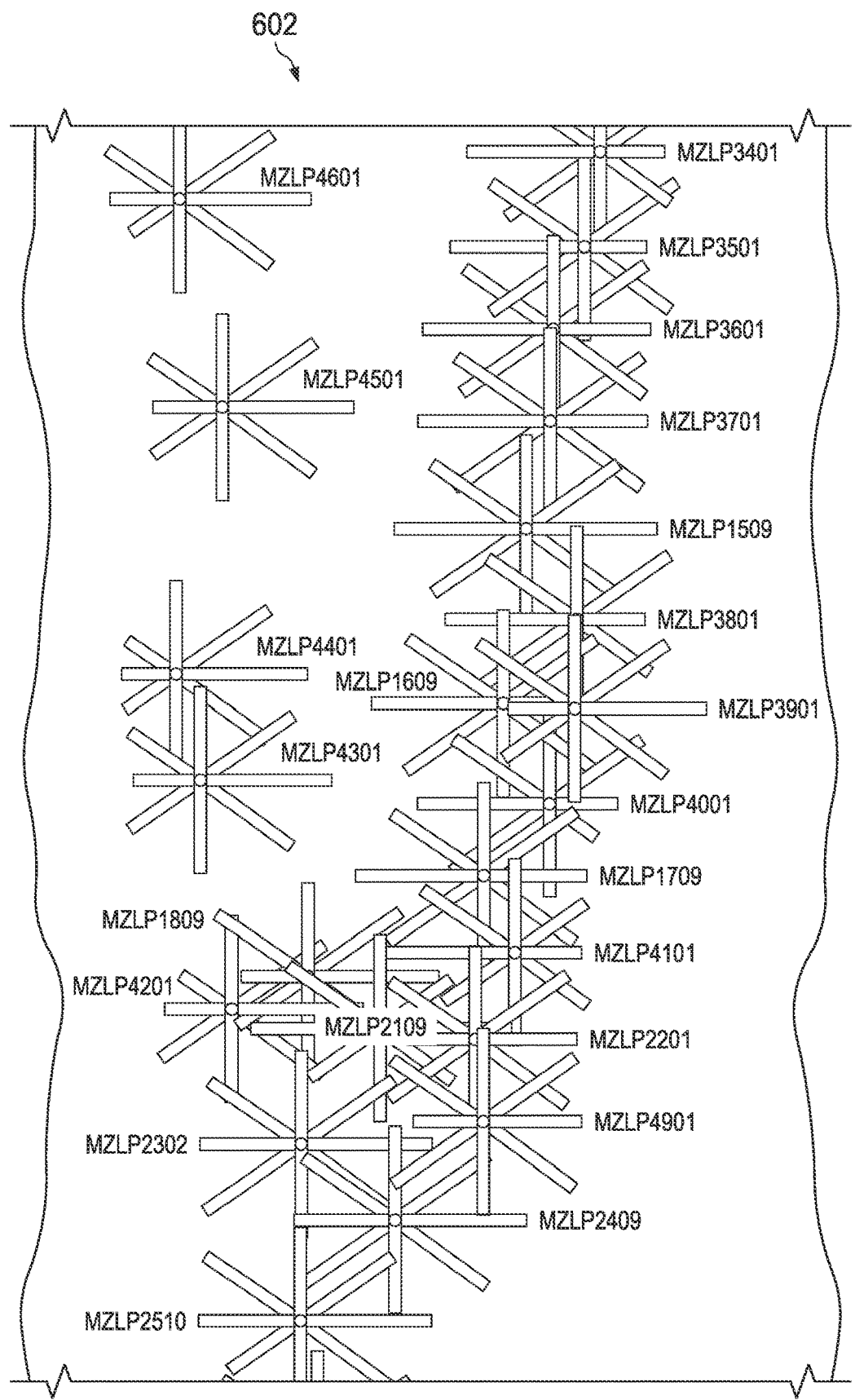
FIGS. 6A and 6B are diagrams showing examples groups of different configurations, according to some implementations of the present disclosure.
Figure 6B:
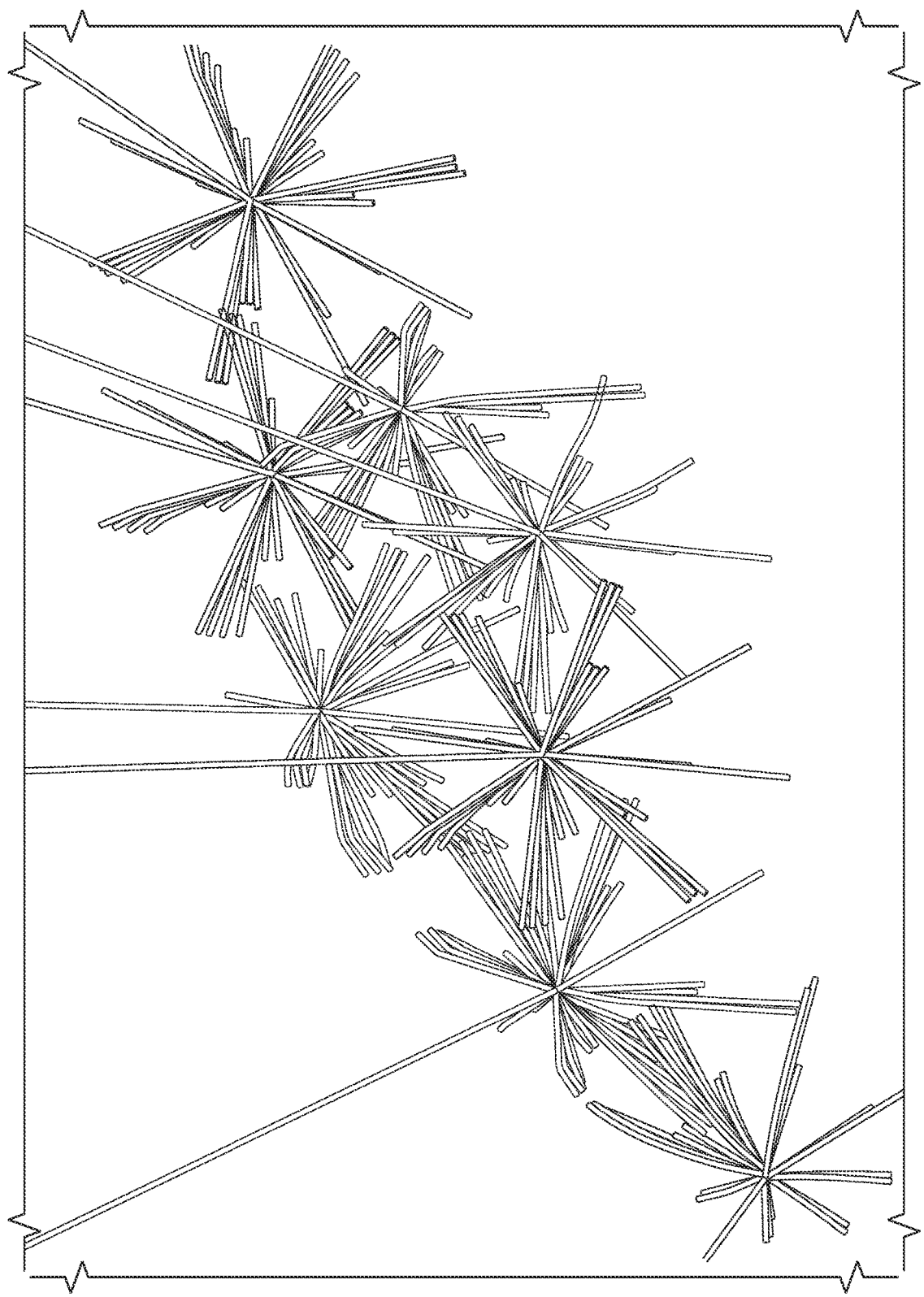

At 118, utilizing computer software, the entire list of well designs are incorporated as part of a dynamic reservoir simulation. As a result of step 116, thousands of well designs and configurations can be generated, being computationally challenging to run. If conducted using conventional techniques, every single well configuration can be attached to a single simulation case, which can require significant set-up time to prepare the cases and can be extremely exhausting computationally when running a simulation. However, using techniques of the present disclosure, to evaluate all of these well scenarios and configurations, all of the designed wells can be supplied to the reservoir simulator upfront, including every single configuration at every TE point. FIGS. 6A and 6B are diagrams showing examples groups 602 and 604 of different configurations, according to some implementations of the present disclosure.

Figure 7A:
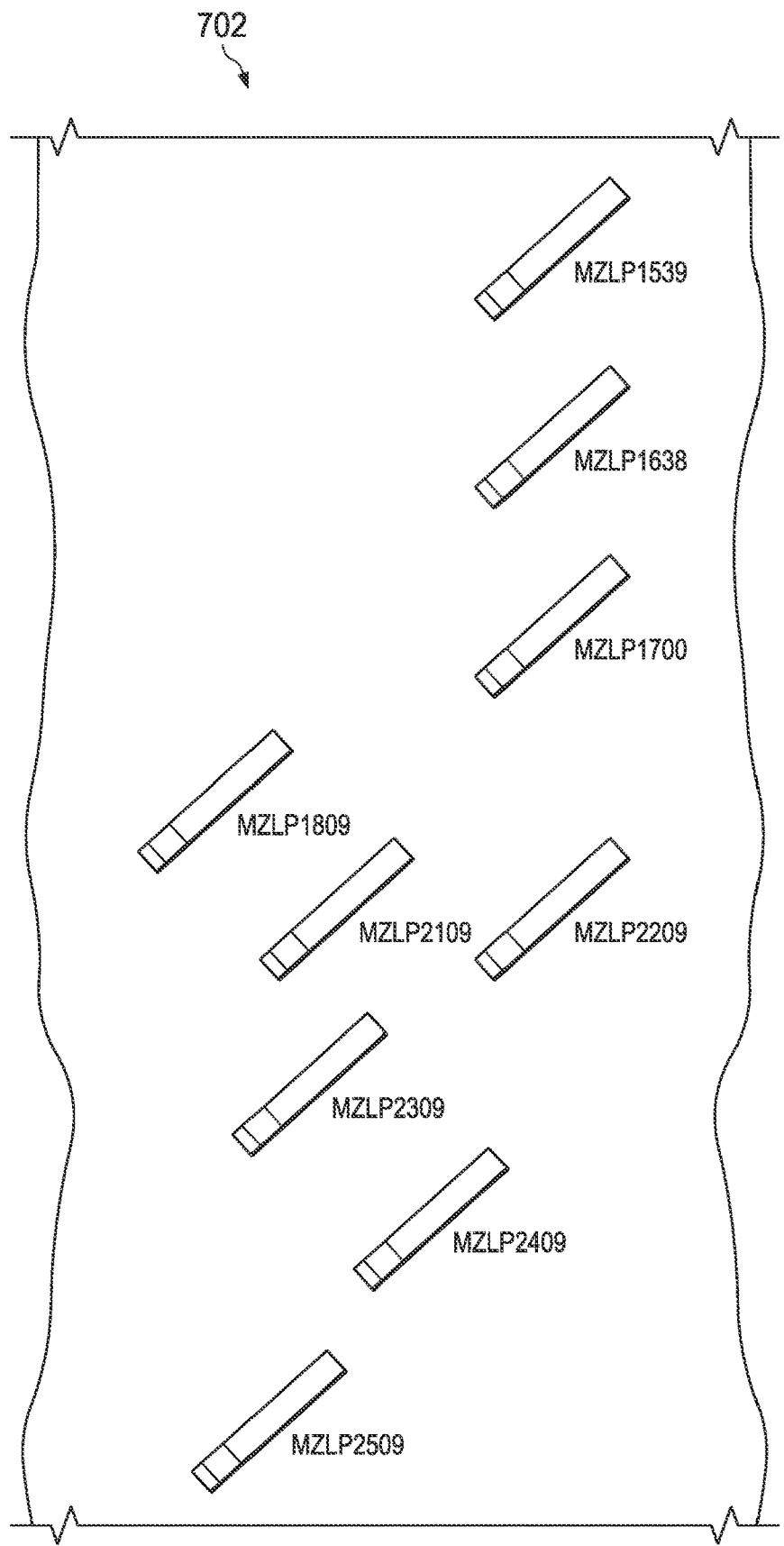
FIGS. 7A and 7B are diagrams showing examples groups of different configurations, according to some implementations of the present disclosure.
Figure 7B:
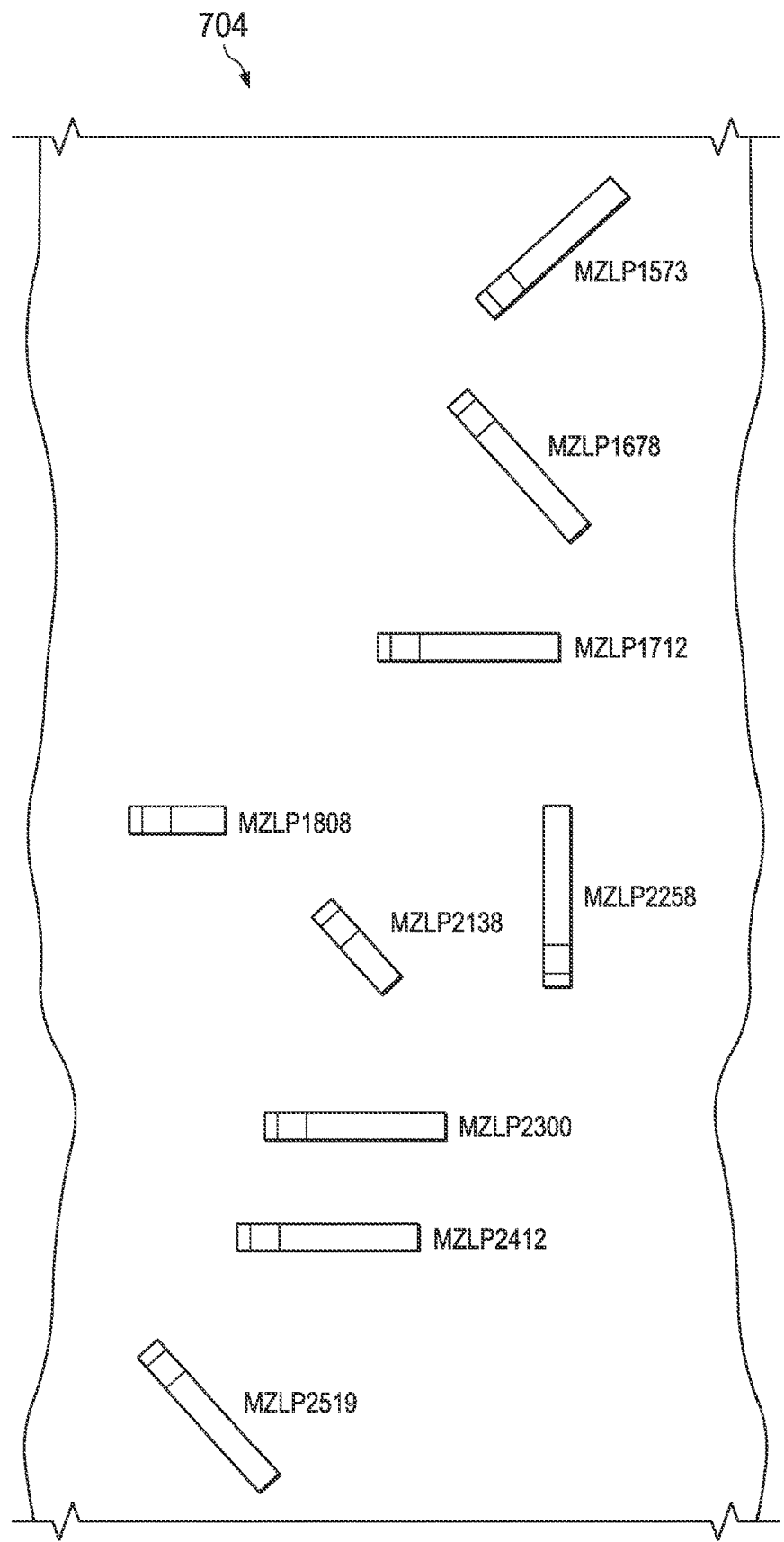

At 120, if so desired during a dynamic simulation, full field development well designs can optional vary simultaneously. If a particular well configuration is to be evaluated, then a different naming convention (other than MZIP##nn) can be used or invoked to fix all configurations of a particular design. Otherwise, every single well can have a different configuration from the other wells. FIGS. 7A and 7B are diagrams showing examples groups 702 and 704 of different configurations, according to some implementations of the present disclosure.

At 122, computer software is utilized to smartly rotate between different well configurations for every single TE. Then, using computer software, a single well is activated randomly (or specifically for a particular configuration) out of all possible configurations at a particular point, for all the points in the reservoir.

At 124, utilizing computer software, every scenario is run through a simulator. A total number of cases equals a total number of scenarios designed at a particular target entry point. This can be coupled with fixed well configurations so that the total number of cases equals the total number of scenarios designed at a particular target entry point multiplied by 2.

At 126, the performance of every well configuration is assessed as part of the full field, and a configuration for each TE is selected. After running all the scenarios for all the wells, total field production volumes can be compared for which a reservoir simulation case (containing a particular blend of well configurations) provides the greatest volume. The corresponding case is then selected. FIG. 8 is a graph 800 showing examples of curves 802 for different configurations plotted relative to time 804 (for example, in years) and production 806 (for example, in millions of barrels), according to some implementations of the present disclosure.

Figure 9B:
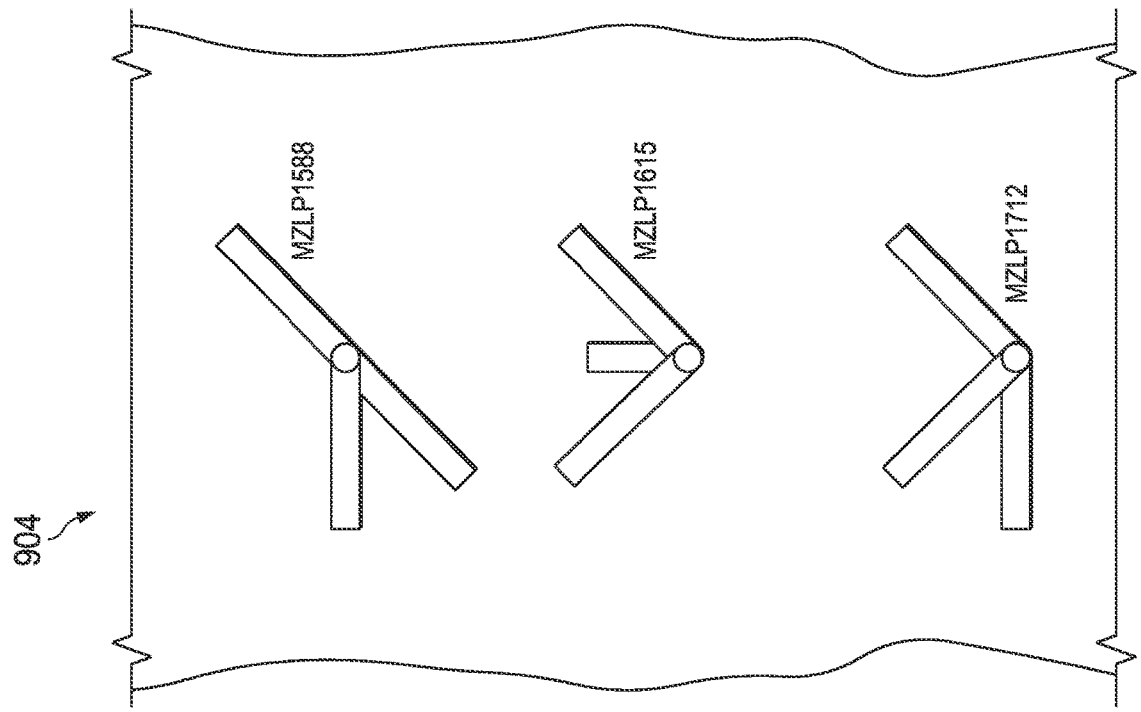
FIG. 9B is a diagram showing an example group of different configurations, according to some implementations of the present disclosure.
Figure 9A:
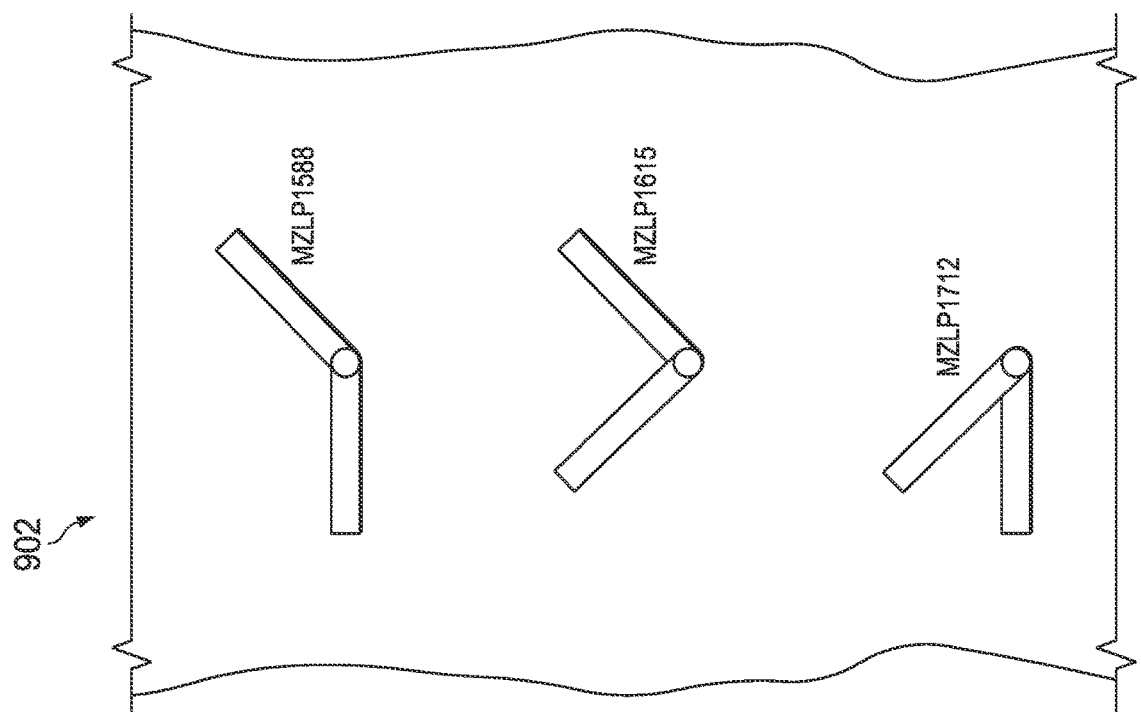
FIG. 9A is a diagram showing an example group of different configurations, according to some implementations of the present disclosure.

At 128, well configurations are fixed for each single lateral, and steps 124-126 are repeated using the same well configurations conjointly with the single lateral design. Step 126 provided an optimum configuration for every point. Those single laterals are now fixed. To evaluate dual- and multilaterals, the same pool of single lateral wells designed previously can be used on top of the single lateral case. FIG. 9A is a diagram showing an example group 902 of different configurations, according to some implementations of the present disclosure.

At 130, step 128 is repeated for tri-laterals and multi-laterals. For example, the first and second laterals are fixed, and third lateral (out of the same pool of designed wells) is tested. FIG. 9B is a diagram showing an example group 904 of different configurations, according to some implementations of the present disclosure.

Figure 10:
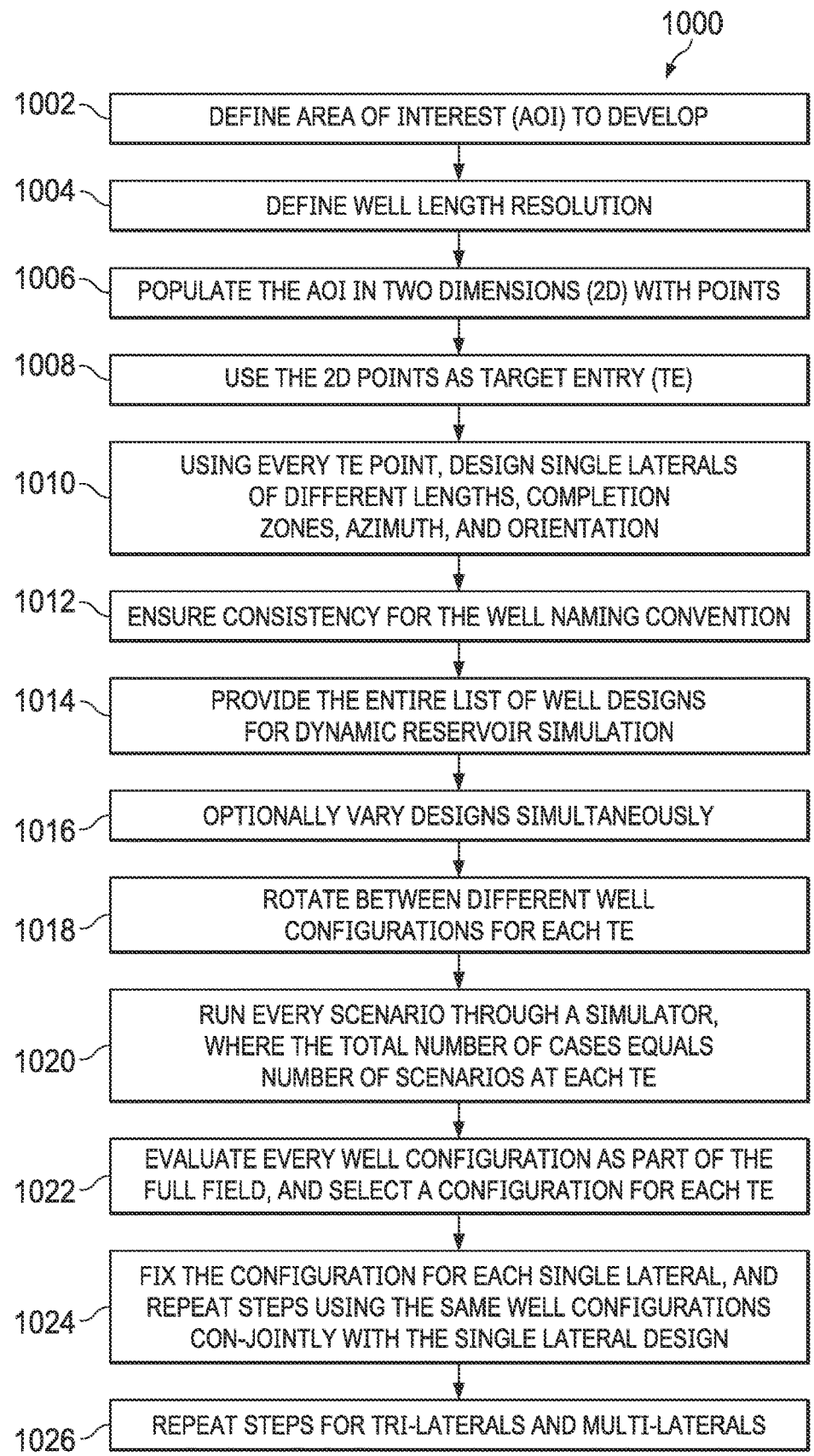
FIG. 10 is a flowchart of an example workflow for performing well placement and configuration, according to some implementations of the present disclosure.

FIG. 10 is a flowchart of an example workflow 1000 for performing well placement and configuration, according to some implementations of the present disclosure. The workflow is similar to the workflow 100. At 1002, an AOI to be developed is defined. At 1004, well length resolution is defined. At 1006, the AOI is populated in 2D with points. At 1008, the 2D points are used as TE points. At 1010, every TE point is used to design single laterals of different lengths, completion zones, azimuth, and orientation. At 1012, consistency for the well naming convention is ensured. At 1014, the entire list of well designs is provided for dynamic reservoir simulation. At 1016, designs are optionally varied. At 1018, rotation is made between different well configurations for each TE. At 1020, every scenario is run through a simulator, where the total number of cases equals the number of scenarios at each TE. At 1022, every well configuration is evaluated as part of the full field, and a configuration is selected for each TE. At 1024, the configuration is fixed for each single lateral, and steps 1010-1022 are repeated using the same well configurations con-jointly with the single lateral design. At 1026, step 1024 is repeated for tri-laterals and multi-laterals.

Figure 11:
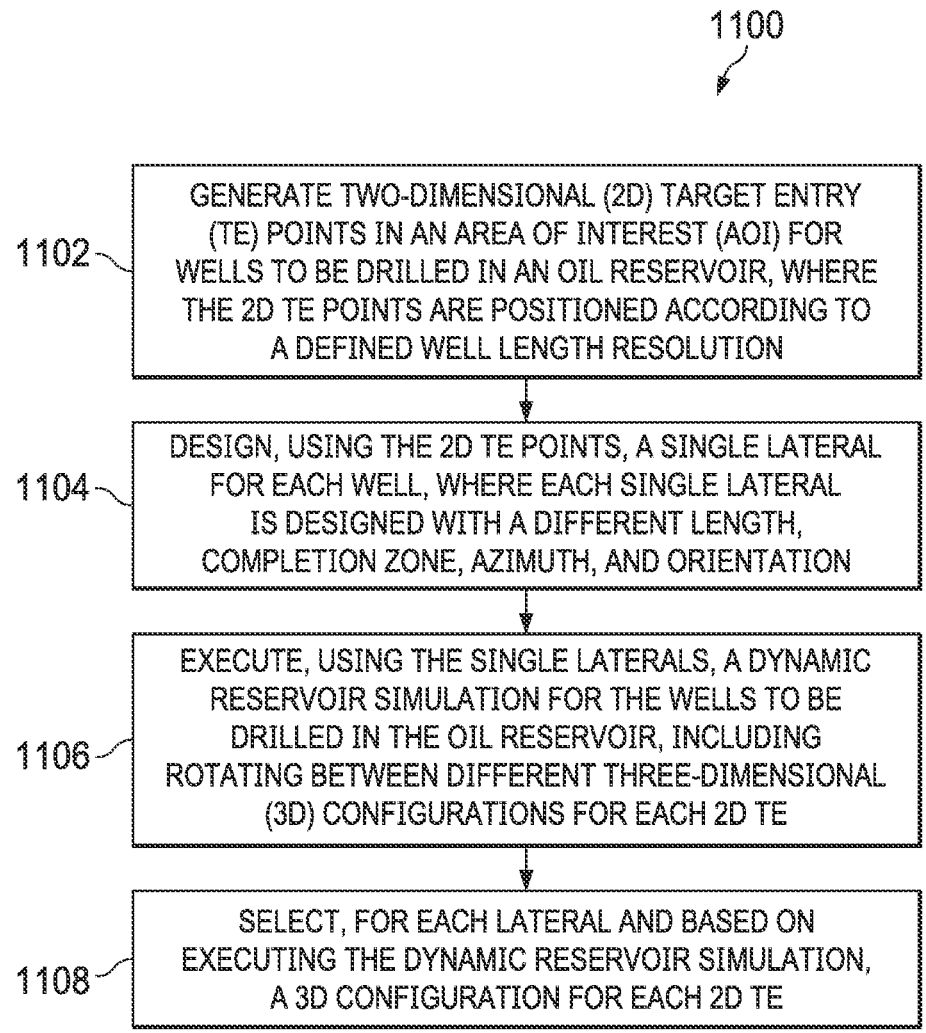
FIG. 11 is a flowchart of an example of a method for performing well placement and configuration, according to some implementations of the present disclosure.

FIG. 11 is a flowchart of an example of a method 1100 for performing well placement and configuration, according to some implementations of the present disclosure. For clarity of presentation, the description that follows generally describes method 1100 in the context of the other figures in this description. However, it will be understood that method 1100 can be performed, for example, by any suitable system, environment, software, and hardware, or a combination of systems, environments, software, and hardware, as appropriate. In some implementations, various steps of method 1100 can be run in parallel, in combination, in loops, or in any order.

At 1102, two-dimensional (2D) target entry (TE) points are generated in an area of interest (AOI) for wells to be drilled in an oil reservoir, where the 2D TE points are positioned according to a defined well length resolution. In some implementations, an indicator can be received through a user interface (such as input by a user into a simulation application) identifying the oil reservoir as a mature reservoir with drilled wells or a green reservoir with no wells. Then the 2D TE points can be generated in the AOI based on the indicator. The 2D TE points can serve as starting points for where to place the wells. Usually, in mature reservoirs, wells are to be drilled from specific target entry points due to drilling requirements and other surrounding wells. However, the workflow of method 1100 can vary in flexibility in utilizing input-2D TE points, or use randomly-generated 2D TE points can be used as starting points for the workflow. For green reservoirs with no wells, a more structured, systematic 2D TE points can be placed as starting points for the workflow to minimize well interference and maximize sweep. However, 2D TE points are only starting points for the workflow, and regardless of the method, the workflow is flexible to accommodate specific points, or ones that are generated randomly.

In some implementations, a definition defining the AOI to be developed can be received through a user interface. In some implementations, a definition of the well length resolution can be received through a user interface. In some implementations, a definition of top and bottom limiting surfaces can be received through a user interface, and the 2D TE points can be generated in the AOI based on the top and bottom limiting surfaces. From 1102, method 1100 proceeds to 1104.

At 1104, a single lateral is designed for each well using the 2D TE points, where each single lateral is designed with a different length, completion zone, azimuth, and orientation. The laterals can correspond to points shown in FIG. 2A, for example. From 1104, method 1100 proceeds to 1106.

At 1106, using the single laterals, a dynamic reservoir simulation is executed for the wells to be drilled in the oil reservoir, including rotating between different three-dimensional (3D) configurations for each 2D TE. Naming the 3D configurations can include using a naming convention, including using an identifier that includes a field/reservoir abbreviation, a producer/injector code, a unique 2D TE identifier, and a well configuration identifier identifying a combination of a lateral length, a target zone, and an azimuth. From 1106, method 1100 proceeds to 1108.

At 1108, a 3D configuration for each 2D TE is selected for each lateral and based on executing the dynamic reservoir simulation. For example, one of the configurations shown in FIG. 9B can be selected. After 1108, method 1100 can stop.

In some implementations, method 1100 further includes repeating the executing for tri-laterals and multilaterals. For example, step 1126 of workflow 1000 can be performed.

Figure 12:
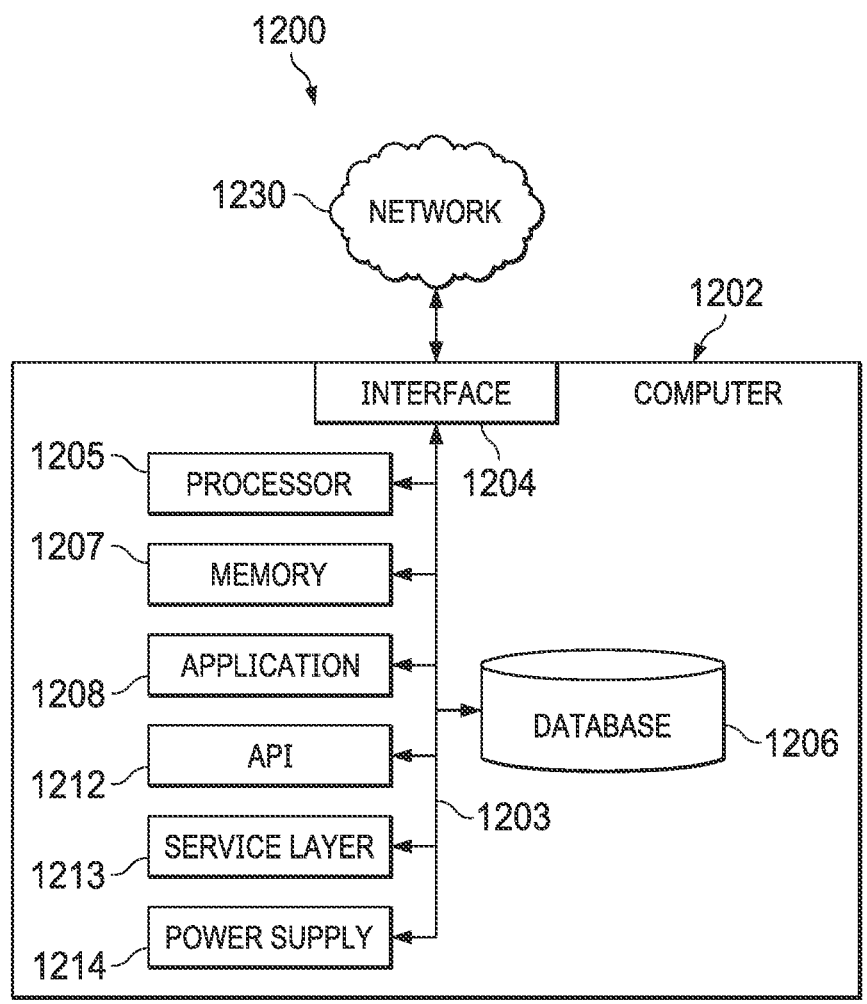
FIG. 12 is a block diagram illustrating an example computer system used to provide computational functionalities associated with described algorithms, methods, functions, processes, flows, and procedures as described in the present disclosure, according to some implementations of the present disclosure.

FIG. 12 is a block diagram of an example computer system 1200 used to provide computational functionalities associated with described algorithms, methods, functions, processes, flows, and procedures described in the present disclosure, according to some implementations of the present disclosure. The illustrated computer 1202 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1202 can include input devices such as keypads, keyboards, and touch screens that can accept user information. Also, the computer 1202 can include output devices that can convey information associated with the operation of the computer 1202. The information can include digital data, visual data, audio information, or a combination of information. The information can be presented in a graphical user interface (UI or GUI).

The computer 1202 can serve in a role as a client, a network component, a server, a database, a persistency, or components of a computer system for performing the subject matter described in the present disclosure. The illustrated computer 1202 is communicably coupled with a network 1230. In some implementations, one or more components of the computer 1202 can be configured to operate within different environments, including cloud-computing-based environments, local environments, global environments, and combinations of environments.

At a top level, the computer 1202 is an electronic computing device operable to receive, transmit, process, store, and manage data and information associated with the described subject matter. According to some implementations, the computer 1202 can also include, or be communicably coupled with, an application server, an email server, a web server, a caching server, a streaming data server, or a combination of servers.

The computer 1202 can receive requests over network 1230 from a client application (for example, executing on another computer 1202). The computer 1202 can respond to the received requests by processing the received requests using software applications. Requests can also be sent to the computer 1202 from internal users (for example, from a command console), external (or third) parties, automated applications, entities, individuals, systems, and computers.

Each of the components of the computer 1202 can communicate using a system bus 1203. In some implementations, any or all of the components of the computer 1202, including hardware or software components, can interface with each other or the interface 1204 (or a combination of both) over the system bus 1203. Interfaces can use an application programming interface (API) 1212, a service layer 1213, or a combination of the API 1212 and service layer 1213. The API 1212 can include specifications for routines, data structures, and object classes. The API 1212 can be either computer-language independent or dependent. The API 1212 can refer to a complete interface, a single function, or a set of APIs.

The service layer 1213 can provide software services to the computer 1202 and other components (whether illustrated or not) that are communicably coupled to the computer 1202. The functionality of the computer 1202 can be accessible for all service consumers using this service layer. Software services, such as those provided by the service layer 1213, can provide reusable, defined functionalities through a defined interface. For example, the interface can be software written in JAVA, C++, or a language providing data in extensible markup language (XML) format. While illustrated as an integrated component of the computer 1202, in alternative implementations, the API 1212 or the service layer 1213 can be stand-alone components in relation to other components of the computer 1202 and other components communicably coupled to the computer 1202. Moreover, any or all parts of the API 1212 or the service layer 1213 can be implemented as child or sub-modules of another software module, enterprise application, or hardware module without departing from the scope of the present disclosure.

The computer 1202 includes an interface 1204. Although illustrated as a single interface 1204 in FIG. 12, two or more interfaces 1204 can be used according to particular needs, desires, or particular implementations of the computer 1202 and the described functionality. The interface 1204 can be used by the computer 1202 for communicating with other systems that are connected to the network 1230 (whether illustrated or not) in a distributed environment. Generally, the interface 1204 can include, or be implemented using, logic encoded in software or hardware (or a combination of software and hardware) operable to communicate with the network 1230. More specifically, the interface 1204 can include software supporting one or more communication protocols associated with communications. As such, the network 1230 or the interface's hardware can be operable to communicate physical signals within and outside of the illustrated computer 1202.

The computer 1202 includes a processor 1205. Although illustrated as a single processor 1205 in FIG. 12, two or more processors 1205 can be used according to particular needs, desires, or particular implementations of the computer 1202 and the described functionality. Generally, the processor 1205 can execute instructions and can manipulate data to perform the operations of the computer 1202, including operations using algorithms, methods, functions, processes, flows, and procedures as described in the present disclosure.

The computer 1202 also includes a database 1206 that can hold data for the computer 1202 and other components connected to the network 1230 (whether illustrated or not). For example, database 1206 can be an in-memory, conventional, or a database storing data consistent with the present disclosure. In some implementations, database 1206 can be a combination of two or more different database types (for example, hybrid in-memory and conventional databases) according to particular needs, desires, or particular implementations of the computer 1202 and the described functionality. Although illustrated as a single database 1206 in FIG. 12, two or more databases (of the same, different, or combination of types) can be used according to particular needs, desires, or particular implementations of the computer 1202 and the described functionality. While database 1206 is illustrated as an internal component of the computer 1202, in alternative implementations, database 1206 can be external to the computer 1202.

The computer 1202 also includes a memory 1207 that can hold data for the computer 1202 or a combination of components connected to the network 1230 (whether illustrated or not). Memory 1207 can store any data consistent with the present disclosure. In some implementations, memory 1207 can be a combination of two or more different types of memory (for example, a combination of semiconductor and magnetic storage) according to particular needs, desires, or particular implementations of the computer 1202 and the described functionality. Although illustrated as a single memory 1207 in FIG. 12, two or more memories 1207 (of the same, different, or combination of types) can be used according to particular needs, desires, or particular implementations of the computer 1202 and the described functionality. While memory 1207 is illustrated as an internal component of the computer 1202, in alternative implementations, memory 1207 can be external to the computer 1202.

The application 1208 can be an algorithmic software engine providing functionality according to particular needs, desires, or particular implementations of the computer 1202 and the described functionality. For example, application 1208 can serve as one or more components, modules, or applications. Further, although illustrated as a single application 1208, the application 1208 can be implemented as multiple applications 1208 on the computer 1202. In addition, although illustrated as internal to the computer 1202, in alternative implementations, the application 1208 can be external to the computer 1202.

The computer 1202 can also include a power supply 1214. The power supply 1214 can include a rechargeable or non-rechargeable battery that can be configured to be either user- or non-user-replaceable. In some implementations, the power supply 1214 can include power-conversion and management circuits, including recharging, standby, and power management functionalities. In some implementations, the power-supply 1214 can include a power plug to allow the computer 1202 to be plugged into a wall socket or a power source to, for example, power the computer 1202 or recharge a rechargeable battery.

There can be any number of computers 1202 associated with, or external to, a computer system containing computer 1202, with each computer 1202 communicating over network 1230. Further, the terms "client," "user," and other appropriate terminology can be used interchangeably, as appropriate, without departing from the scope of the present disclosure. Moreover, the present disclosure contemplates that many users can use one computer 1202 and one user can use multiple computers 1202.

Described implementations of the subject matter can include one or more features, alone or in combination.

For example, in a first implementation, a computer-implemented method includes the following. Two-dimensional (2D) target entry (TE) points are generated in an area of interest (AOI) for wells to be drilled in an oil reservoir, where the 2D TE points are positioned according to a defined well length resolution. A single lateral is designed for each well using the 2D TE points, where each single lateral is designed with a different length, completion zone, azimuth, and orientation. Using the single laterals, a dynamic reservoir simulation is executed for the wells to be drilled in the oil reservoir, including rotating between different three-dimensional (3D) configurations for each 2D TE. A 3D configuration for each 2D TE is selected for each lateral and based on executing the dynamic reservoir simulation.

The foregoing and other described implementations can each, optionally, include one or more of the following features:

A first feature, combinable with any of the following features, the method further including repeating the executing for tri-laterals and multilaterals.

A second feature, combinable with any of the previous or following features, the method further including naming the 3D configurations using a naming convention using an identifier including a field/reservoir abbreviation, a producer/injector code, a unique 2D TE identifier, and a well configuration identifier identifying a combination of a lateral length, a target zone, and an azimuth.

A third feature, combinable with any of the previous or following features, the method further including: receiving, through a user interface, an indicator identifying the oil reservoir as a mature reservoir with drilled wells or a green reservoir with no wells; and generating the 2D TE points in the AOI based on the indicator.

A fourth feature, combinable with any of the previous or following features, the method further including receiving, through a user interface, a definition defining the AOI to be developed.

A fifth feature, combinable with any of the previous or following features, the method further including receiving, through a user interface, a definition of the well length resolution.

A sixth feature, combinable with any of the previous or following features, the method further including: receiving, through a user interface, a definition of top and bottom limiting surfaces; and generating the 2D TE points in the AOI based on the top and bottom limiting surfaces.

In a second implementation, a non-transitory, computer-readable medium stores one or more instructions executable by a computer system to perform operations including the following. Two-dimensional (2D) target entry (TE) points are generated in an area of interest (AOI) for wells to be drilled in an oil reservoir, where the 2D TE points are positioned according to a defined well length resolution. A single lateral is designed for each well using the 2D TE points, where each single lateral is designed with a different length, completion zone, azimuth, and orientation. Using the single laterals, a dynamic reservoir simulation is executed for the wells to be drilled in the oil reservoir, including rotating between different three-dimensional (3D) configurations for each 2D TE. A 3D configuration for each 2D TE is selected for each lateral and based on executing the dynamic reservoir simulation.

The foregoing and other described implementations can each, optionally, include one or more of the following features:

A first feature, combinable with any of the following features, the operations further including repeating the executing for tri-laterals and multilaterals.

A second feature, combinable with any of the previous or following features, the operations further including naming the 3D configurations using a naming convention using an identifier including a field/reservoir abbreviation, a producer/injector code, a unique 2D TE identifier, and a well configuration identifier identifying a combination of a lateral length, a target zone, and an azimuth.

A third feature, combinable with any of the previous or following features, the operations further including: receiving, through a user interface, an indicator identifying the oil reservoir as a mature reservoir with drilled wells or a green reservoir with no wells; and generating the 2D TE points in the AOI based on the indicator.

A fourth feature, combinable with any of the previous or following features, the operations further including receiving, through a user interface, a definition defining the AOI to be developed.

A fifth feature, combinable with any of the previous or following features, the operations further including receiving, through a user interface, a definition of the well length resolution.

A sixth feature, combinable with any of the previous or following features, the operations further including: receiving, through a user interface, a definition of top and bottom limiting surfaces; and generating the 2D TE points in the AOI based on the top and bottom limiting surfaces.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Two-dimensional (2D) target entry (TE) points are generated in an area of interest (AOI) for wells to be drilled in an oil reservoir, where the 2D TE points are positioned according to a defined well length resolution. A single lateral is designed for each well using the 2D TE points, where each single lateral is designed with a different length, completion zone, azimuth, and orientation. Using the single laterals, a dynamic reservoir simulation is executed for the wells to be drilled in the oil reservoir, including rotating between different three-dimensional (3D) configurations for each 2D TE. A 3D configuration for each 2D TE is selected for each lateral and based on executing the dynamic reservoir simulation.

The foregoing and other described implementations can each, optionally, include one or more of the following features:

A first feature, combinable with any of the following features, the operations further including repeating the executing for tri-laterals and multilaterals.

A second feature, combinable with any of the previous or following features, the operations further including naming the 3D configurations using a naming convention using an identifier including a field/reservoir abbreviation, a producer/injector code, a unique 2D TE identifier, and a well configuration identifier identifying a combination of a lateral length, a target zone, and an azimuth.

A third feature, combinable with any of the previous or following features, the operations further including: receiving, through a user interface, an indicator identifying the oil reservoir as a mature reservoir with drilled wells or a green reservoir with no wells; and generating the 2D TE points in the AOI based on the indicator.

A fourth feature, combinable with any of the previous or following features, the operations further including receiving, through a user interface, a definition defining the AOI to be developed.

A fifth feature, combinable with any of the previous or following features, the operations further including receiving, through a user interface, a definition of the well length resolution.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:
1. A computer-implemented method, comprising:
   generating two-dimensional (2D) target entry (TE) points in an area of interest (AOI) for wells to be drilled in an oil reservoir, wherein the 2D TE points are positioned according to a defined well length resolution;

designing single laterals, using the 2D TE points, wherein for each well, a single lateral is designed with a respective length, a completion zone, an azimuth, and an orientation;

executing, using the single laterals, a dynamic reservoir simulation for the wells to be drilled in the oil reservoir, comprising rotating between different three-dimensional (3D) configurations for each 2D TE point;

naming the 3D configurations using a naming convention using an identifier comprising a field abbreviation or a reservoir abbreviation, a producer code or an injector code, a unique 2D TE identifier, and a well configuration identifier identifying a combination of a lateral length, a target zone, and the azimuth;

selecting, for each lateral and based on executing the dynamic reservoir simulation, a respective 3D configuration for each 2D TE point; and drilling the wells in the oil reservoir using the 2D TE points, wherein each single lateral for each well is drilled according to the respective 3D configuration for each 2D TE point, with the respective length, the completion zone, the azimuth, and the orientation.

2. The computer-implemented method of claim 1, further comprising repeating the executing for tri-laterals and multilaterals.

3. The computer-implemented method of claim 1, further comprising:

receiving, through a user interface, an indicator identifying the oil reservoir as a mature reservoir with drilled wells or a green reservoir with no wells; and generating the 2D TE points in the AOI based on the indicator.

4. The computer-implemented method of claim 1, further comprising receiving, through a user interface, a definition defining the AOI to be developed.

5. The computer-implemented method of claim 1, further comprising receiving, through a user interface, a definition of the defined well length resolution.

6. The computer-implemented method of claim 1, further comprising:

receiving, through a user interface, a definition of top and bottom limiting surfaces; and generating the 2D TE points in the AOI based on the top and bottom limiting surfaces.

7. A non-transitory, computer-readable medium storing one or more instructions executable by a computer system to perform operations comprising:

generating two-dimensional (2D) target entry (TE) points in an area of interest (AOI) for wells to be drilled in an oil reservoir, wherein the 2D TE points are positioned according to a defined well length resolution;

designing single laterals, using the 2D TE points, wherein for each well, a single lateral is designed with a respective length, a completion zone, an azimuth, and an orientation;

executing, using the single laterals, a dynamic reservoir simulation for the wells to be drilled in the oil reservoir, comprising rotating between different three-dimensional (3D) configurations for each 2D TE point;

naming the 3D configurations using a naming convention using an identifier comprising a field abbreviation or a reservoir abbreviation, a producer code or an injector code, a unique 2D TE identifier, and a well configuration identifier identifying a combination of a lateral length, a target zone, and the azimuth;

selecting, for each lateral and based on executing the dynamic reservoir simulation, a respective 3D configuration for each 2D TE point; and drilling the wells in the oil reservoir using the 2D TE points, wherein each single lateral for each well is drilled according to the respective 3D configuration for each 2D TE point, with the respective length, the completion zone, the azimuth, and the orientation.

8. The non-transitory, computer-readable medium of claim 7, the operations further comprising repeating the executing for tri-laterals and multilaterals.

9. The non-transitory, computer-readable medium of claim 7, the operations further comprising:

receiving, through a user interface, an indicator identifying the oil reservoir as a mature reservoir with drilled wells or a green reservoir with no wells; and generating the 2D TE points in the AOI based on the indicator.

10. The non-transitory, computer-readable medium of claim 7, the operations further comprising receiving, through a user interface, a definition defining the AOI to be developed.

11. The non-transitory, computer-readable medium of claim 7, the operations further comprising receiving, through a user interface, a definition of the defined well length resolution.

12. The non-transitory, computer-readable medium of claim 7, the operations further comprising:

receiving, through a user interface, a definition of top and bottom limiting surfaces; and generating the 2D TE points in the AOI based on the top and bottom limiting surfaces.

13. A computer-implemented system, comprising:

one or more processors; and a non-transitory computer-readable storage medium coupled to the one or more processors and storing programming instructions for execution by the one or more processors, the programming instructions instructing the one or more processors to perform operations comprising:

generating two-dimensional (2D) target entry (TE) points in an area of interest (AOI) for wells to be drilled in an oil reservoir, wherein the 2D TE points are positioned according to a defined well length resolution;

designing single laterals, using the 2D TE points, wherein for each well, a single lateral is designed with a respective length, a completion zone, an azimuth, and an orientation;

executing, using the single laterals, a dynamic reservoir simulation for the wells to be drilled in the oil reservoir, comprising rotating between different three-dimensional (3D) configurations for each 2D TE point;

naming the 3D configurations using a naming convention using an identifier comprising a field abbreviation or a reservoir abbreviation, a producer code or an injector code, a unique 2D TE identifier, and a well configuration identifier identifying a combination of a lateral length, a target zone, and the azimuth;

selecting, for each lateral and based on executing the dynamic reservoir simulation, a respective 3D configuration for each 2D TE point; and drilling the wells in the oil reservoir using the 2D TE points, wherein each single lateral for each well is drilled according to the respective 3D configuration for each 2D TE point, with the respective length, the completion zone, the azimuth, and the orientation.

14. The computer-implemented system of claim 13, the operations further comprising repeating the executing for tri-laterals and multilaterals.

15. The computer-implemented system of claim 13, the operations further comprising:
  receiving, through a user interface, an indicator identifying the oil reservoir as a mature reservoir with drilled wells or a green reservoir with no wells; and
  generating the 2D TE points in the AOI based on the indicator.

16. The computer-implemented system of claim 13, the operations further comprising receiving, through a user interface, a definition defining the AOI to be developed.

17. The computer-implemented system of claim 13, the operations further comprising receiving, through a user interface, a definition of the defined well length resolution.

\* \* \* \* \*